US009495762B2

(12) United States Patent
Shroff et al.

(10) Patent No.: US 9,495,762 B2
(45) Date of Patent: Nov. 15, 2016

(54) DETECTING AND COMPENSATING FOR MOTION BETWEEN A FLASH AND A NO-FLASH IMAGE

(71) Applicant: QUALCOMM Incorporated, San Diego, CA (US)

(72) Inventors: Nitesh Shroff, San Diego, CA (US); Ramin Rezaiifar, Del Mar, CA (US); Chiachi Sung, San Diego, CA (US); Piyush Sharma, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 3 days.

(21) Appl. No.: 14/710,474

(22) Filed: May 12, 2015

(65) Prior Publication Data
US 2015/0332475 A1    Nov. 19, 2015

Related U.S. Application Data

(60) Provisional application No. 61/993,064, filed on May 14, 2014.

(51) Int. Cl.
*G06K 9/00* (2006.01)
*G06T 7/20* (2006.01)
(Continued)

(52) U.S. Cl.
CPC .......... *G06T 7/2033* (2013.01); *G06K 9/00771* (2013.01); *G06T 7/204* (2013.01); *G06T 7/2066* (2013.01); *H04N 1/60* (2013.01); *H04N 1/6086* (2013.01); *H04N 5/144* (2013.01); *H04N 5/145* (2013.01); *H04N 5/147* (2013.01); *H04N 5/235* (2013.01); *H04N 13/02* (2013.01);
(Continued)

(58) Field of Classification Search
CPC ............ G06T 2207/10016; G06T 2207/30196; G06T 7/2066; G06T 2207/30232; G06T 7/2033; G06T 7/204; H04N 1/60; H04N 5/144; H04N 5/145; H04N 13/0221; H04N 5/147; H04N 1/6086; H04N 13/02; H04N 5/235; H04N
USPC ....................................................... 382/103
(Continued)

(56) References Cited

U.S. PATENT DOCUMENTS 6,122,319 A    9/2000 Lee et al.
2004/0131231 A1    7/2004 Smilansky
(Continued)

OTHER PUBLICATIONS

Hiral Raveshiya et al., Motion Estimation Using Optical Flow Concepts, Mar.-Apr. 2012, Computer Technology & Applications,vol. 3 (2), 696-700, Retrieved from Internet on Jun. 28, 2016 from URL:<http://www.ijcta.com/documents/volumes/vol3issue2/ijcta2012030227.pdf>.*
(Continued)

*Primary Examiner* — Gregory F Cunningham
(74) *Attorney, Agent, or Firm* — Kilpatrick Townsend & Stockton, LLP (57) ABSTRACT

Techniques disclosed herein involve determining motion occurring in a scene between the capture of two successively-captured images of the scene using intensity gradients of pixels within the images. These techniques can be used alone or with other motion-detection techniques to identify where motion has occurred in the scene, which can be further used to reduce artifacts that may be generated when images are combined.

20 Claims, 6 Drawing Sheets

(51) Int. Cl.
  *H04N 5/14* (2006.01)
  *H04N 13/02* (2006.01)
  *H04N 1/60* (2006.01)
  *H04N 5/235* (2006.01)

(52) U.S. Cl.
  CPC ...... *H04N 13/0221* (2013.01); *G06K 2209/21* (2013.01); *G06T 2207/10016* (2013.01); *G06T 2207/10152* (2013.01); *G06T 2207/30196* (2013.01); *G06T 2207/30232* (2013.01); *H04N 2209/044* (2013.01)

(58) Field of Classification Search
  CPC ..................... 2209/044;G06K 9/00771; G06K 2209/21
  See application file for complete search history.

(56) References Cited

U.S. PATENT DOCUMENTS

2005/0089196 A1    4/2005  Gu et al.
2006/0055827 A1    3/2006  Kawahara
2009/0136146 A1    5/2009  Kaino et al.

OTHER PUBLICATIONS

Burt, Peter J., et al., "A Multiresolution Spline With Application to Image Mosaics" ACM Transactions on Graphics, vol. 2, No. 4, Oct. 1983, pp. 217-236.

Jacobs, David W., et al., "Comparing Images Under Variable Illumination" Proceedings, IEEE Computer Society Conference on Computer Vision and Pattern Recognition, Jun. 23-25, 1998, 7 pages.

Mertens Tom, et al.,"Exposure Fusion," Computer Graphics and Applications, 2007, PG '07. 15th Pacific Conference, Oct. 29-Nov. 2, 2007, 9 pages.

Szeliski, Richard, "Computer Vision: Algorithms and Applications" Sep. 3, 2010, Springer, 979 pages.

\* cited by examiner

DETECTING AND COMPENSATING FOR MOTION BETWEEN A FLASH AND A NO-FLASH IMAGE

CROSS-REFERENCE TO RELATED APPLICATIONS

This application claims the benefit of U.S. Provisional Patent Application Ser. No. 61/993,064, entitled "DETECTING AND COMPENSATING FOR MOTION BETWEEN A FLASH AND A NO-FLASH IMAGE," filed on May 14, 2014, which is assigned to the assignee hereof and incorporated herein by reference for all purposes.

BACKGROUND

Low-light imaging on cellphone cameras is one of the biggest limitations of mobile photography, and a competing feature on smartphones. Using a flash can improve photographs by brightening up the scene; however, it can also lead to loss of the pleasing warmth of the image. Using the flash can also make parts of the scene that are far from its reach look further dark in the image. Moreover, it can cause specularities in certain areas leading to the loss of texture.

SUMMARY

Techniques disclosed herein involve determining motion occurring in a scene between the capture of two successively-captured images of the scene using intensity gradients of pixels within the images. These techniques can be used alone or with other motion-detection techniques to identify where motion has occurred in the scene, which can be further used to reduce artifacts that may be generated when images are combined.

An example method of detecting motion between two images of a scene, according to the description, comprises obtaining a first image of the scene, the first image having a first plurality of pixels and obtaining a second image of the scene, the second image having a second plurality of pixels. An illuminance of the scene in the second image is different than the an illuminance of the scene in the first image. The method further includes determining, for each pixel in both the first plurality of pixels and the second plurality of pixels, a spatial gradient of an intensity of the pixel, and determining that motion has occurred in the scene by comparing the spatial gradient of the intensity of at least one pixel in the first plurality of pixels with the spatial gradient of the intensity of at least one pixel in the second plurality of pixels.

The example method can include one or more of the following features. Comparing the spatial gradient of the intensity of the at least one pixel in the first plurality of pixels with the spatial gradient of the intensity of the at least one pixel in the second plurality of pixels can comprise determining that the spatial gradient of the intensity of the at least one pixel in the first plurality of pixels deviates from the spatial gradient of the intensity of the at least one pixel in the second plurality of pixels by more than a threshold value. The method further comprises computing a motion mask based on the determination that motion has occurred. The first image can be a first ratio image comprising a pixel-wise ratio of a first captured image of the scene to a second captured image of the scene, and the second image can be a second ratio image comprising a pixel-wise ratio of the second captured image of the scene to the first captured image of the scene. The first image can comprise a first captured image of the scene in which the scene is illuminated by a flash, and the second image can comprise a second captured image of the scene in which the scene is not illuminated by the flash. The method can comprise creating a third image of the scene based on the determination that motion has occurred. Creating the third image of the scene can comprise utilizing a Laplacian pyramid fusion technique where a motion mask, indicative of the determined motion, is generated at all pyramid levels. Creating the third image of the scene can comprise utilizing a Laplacian pyramid fusion technique, where a motion mask, indicative of the determined motion, is not generated in at least the level having the lowest resolution. The method may include creating a motion mask having the same resolution as the first image and the second image, the motion mask indicating, for each pixel in the motion mask, if motion is detected.

An example apparatus, according to the description, can comprise a memory and a processing unit communicatively coupled to the memory. The processing unit is configured to obtain a first image of a scene, the first image having a first plurality of pixels, and obtain a second image of the scene, the second image having a second plurality of pixels. An illuminance of the scene in the second image is different than the an illuminance of the scene in the first image. The processing unit is also configured to determine, for each pixel in both the first plurality of pixels and the second plurality of pixels, a spatial gradient of an intensity of the pixel, and determine that motion has occurred in the scene by comparing the spatial gradient of the intensity of at least one pixel in the first plurality of pixels with the spatial gradient of the intensity of at least one pixel in the second plurality of pixels.

The example apparatus can include one or more of the following features. The processing unit can be configured to compare the spatial gradient of the intensity of the at least one pixel in the first plurality of pixels with the spatial gradient of the intensity of the at least one pixel in the second plurality of pixels by determining that the spatial gradient of the intensity of the at least one pixel in the first plurality of pixels deviates from the spatial gradient of the intensity of the at least one pixel in the second plurality of pixels by more than a threshold value. The processing unit can be further configured to compute a motion mask based on the determination that motion has occurred. The apparatus can further comprise a camera communicatively coupled to the processing unit and configured to capture a first captured image of the scene and a second captured image of the scene, where the first image is a first ratio image comprising a pixel-wise ratio of the first captured image of the scene to the second captured image of the scene, the second image is a second ratio image comprising a pixel-wise ratio of the second captured image of the scene to the first captured image of the scene, and the processing unit can be further configured to create the first image and the second image from the first captured image of the scene to the second captured image of the scene. The processing unit can be further configured to create a third image of the scene based on the determination that motion has occurred. The processing unit can be configured to create the third image of the scene by utilizing a Laplacian pyramid fusion technique where a motion mask, indicative of the determined motion, is generated at all pyramid levels. The processing unit can be configured to create the third image of the scene by utilizing a Laplacian pyramid fusion technique where a motion mask, indicative of the determined motion, is not generated in at least the level having the lowest resolution. The processing unit is configured to create a motion mask having the same resolution as the first image and the second image, the motion mask indicating, for each pixel in the motion mask, if motion is detected.

An example non-tangible computer-readable medium, according to the disclosure, has instructions embedded therein for detecting motion between two images of a scene. The instructions comprise computer code for causing one or more computers to obtain a first image of the scene, the first image having a first plurality of pixels, and obtain a second image of the scene, the second image having a second plurality of pixels, wherein an illuminance of the scene in the second image is different than the an illuminance of the scene in the first image. The instructions further comprise computer code for causing one or more computers to determine, for each pixel in both the first plurality of pixels and the second plurality of pixels, a spatial gradient of an intensity of the pixel, and determine that motion has occurred in the scene by comparing the spatial gradient of the intensity of at least one pixel in the first plurality of pixels with the spatial gradient of the intensity of at least one pixel in the second plurality of pixels.

The instructions of the non-tangible computer-readable medium can further comprise computer code for implementing one or more of the following features. The instructions can further comprise computer code for causing the one or more computers to compute a motion mask based on the determination that motion has occurred. The instructions can further comprise computer code for causing the one or more computers to create a third image of the scene based on the determination that motion has occurred.

BRIEF DESCRIPTION OF THE DRAWINGS

An understanding of the nature and advantages of various embodiments may be realized by reference to the following figures.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention include techniques in which the flash and ambient (a.k.a. no-flash) images of a scene are combined, or "fused," to produce one image of the scene that includes desirable qualities from both the flash and ambient images. It will be understood, however, that the techniques herein may also be applied to any pair of images of a scene in which there is a change of illuminance from one image to the next, regardless of whether a flash was used. It will be further understood that although techniques for identifying motion are described in the context of image fusion, they may be utilized, additionally or alternatively, in other applications.

Figure 1A:
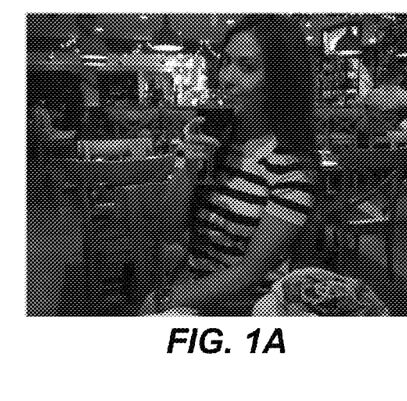
FIGS. 1A-1C are a series of example photographs and an image generated therefrom, which helps illustrate the benefits of an embodiment of a fusion process.
Figure 1B:
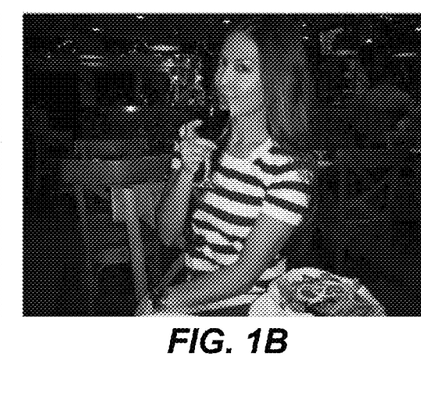
Figure 1C:
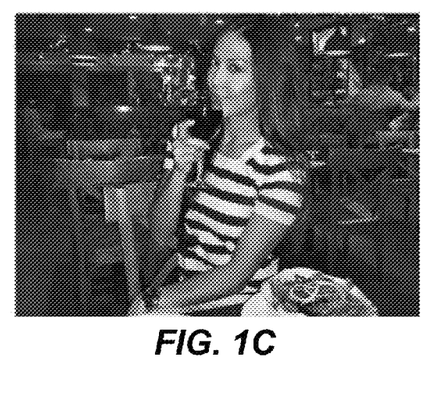

FIGS. 1A-1C are a series of example photographs and an image (FIG. 1C) generated therefrom that help illustrate the benefits of the fusion process. FIG. 1A is an ambient image of a scene captured by a camera in ambient lighting, without a flash. FIG. 1B is a flash image of a scene captured by a camera while a flash—in this case, a flash light-emitting diode (LED)—is illuminating the scene. FIG. 1C is an example image resulting from the fusion of ambient and flash images using techniques described herein.

Generally speaking, and as illustrated in FIGS. 1A and 1B, there may be stark differences between an ambient image (referred to generically herein as $I_a$) and a corresponding flash image (referred to generically herein as $I_f$). These differences can make the fusion of the two images a very challenging task. Understanding the differences between the two images can help in avoiding artifacts introduced by the fusion. Some of these differences can be described as follows:

1) Illumination condition changes drastically between $I_a$ and $I_f$ due to the introduction of the flash light in $I_f$.
2) In conjunction with the previous point, the difference in illuminance between $I_a$ and $I_f$ itself varies with the depth of the scene elements. This is because the intensity of the flash light reaching a scene point depends largely on the depth of the scene element.
3) Exposure time is significantly reduced for $I_f$ because the scene is brighter. This also serves the purpose of keeping $I_f$ as a sharp image (i.e., reduced camera motion blur).
4) The color temperature of the flash LED is different in general from the ambient lighting. This in turn varies the auto-white balance between the two images applied as part of the camera pipeline.
5) $I_a$ is significantly noisy, especially in darker parts of the scene.
6) The flash LED firing introduces specularities in $I_f$.
7) Shadow patterns could be very different between $I_a$ and $I_f$ because of the introduction of flash LED. Some shadows are introduced and some are removed.

Thus, techniques for combining, or fusing, $I_a$ and $I_f$ can address some or all of these differences. However, embodiments provided herein are directed toward addressing yet another difference. In particular, because flash and ambient images are taken in succession, movement may occur between the capture of one image and the capture of the other, which can make the combination of $I_a$ and $I_f$ challenging. Embodiments can employ techniques to detect and address the motion between the two images. Such embodiments may also employ techniques that address some or all of the other differences between the images described above, thereby resulting in a combined image with more desirable qualities than either of $I_a$ or $I_f$ itself.

In addition to being efficient and robust, techniques disclosed herein can have very small latency. In some implementations, latency is under 700 milliseconds for a 13-megapixel image measured on the mobile phone. The robustness of the proposed framework is validated by the experimental results on a very diverse dataset of images.

Figure 2A:
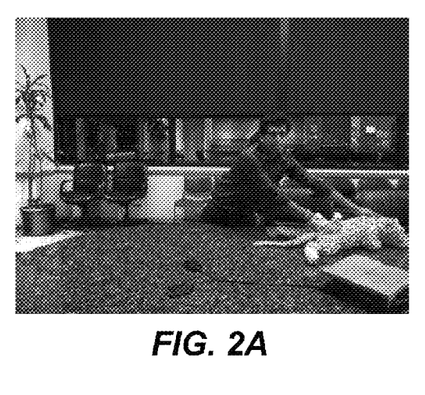
FIGS. 2A-2D are a series of example photographs and images generated therefrom, provided to help illustrate problems in a fused image that can occur when there is movement in the captured scene between the time when the ambient image is captured and when the flash image is captured.
Figure 2B:
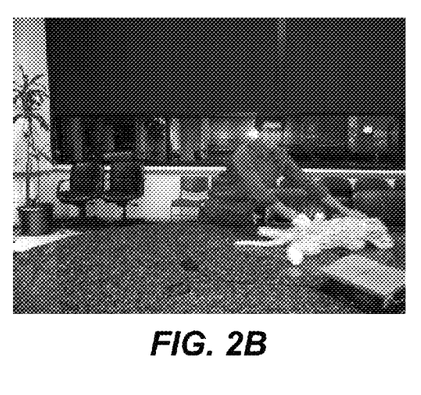

FIGS. 2A-2D are a series of photographs and images derived therefrom, provided to help illustrate problems in a fused image that can occur when there is movement in the captured scene between the time when the ambient image is captured and when the flash image is captured. Images shown are of a subject moving a stuffed toy across a large table. FIG. 2A is the ambient image, and FIG. 2B is the flash image. A comparison of FIGS. 2A and 2B will show that the subject's arms move from one image (FIG. 2A) to the next (FIG. 2B), along with the stuffed toy.

Figure 2C:
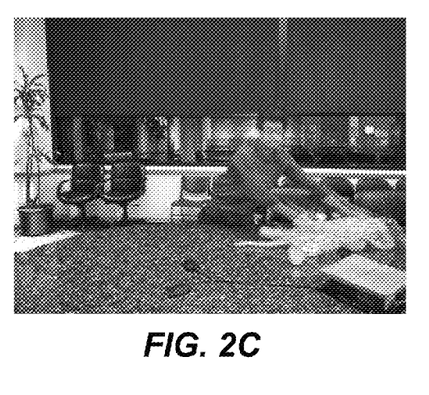
Figure 2D:
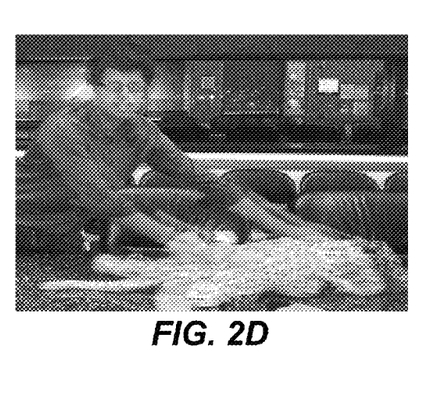

Fusing these images without explicitly addressing this motion—as shown in FIG. 2C, which is a fused image of the images of FIGS. 2A and 2B—leads to ghosty artifacts in the fused image. FIG. 2D is a close-up view of the area in the fused image of FIG. 2C having ghosty artifacts, which are seen around the areas of movement—especially the subject's arms and the stuffed toy.

The ghost in the fused image is typically unacceptable and motivates the desire to explicitly detect motion areas in the scene. Traditional techniques of motion detection can be inadequate for at least two reasons. First, images are frequently captured in low-light scenarios can be lot noisier. This noise can be problematic for traditional motion detection techniques. Moreover, there can be parts of the scene that are visible in one image that are not-visible in the other. Second, by introducing the lighting from the flash, the scene illumination changes along with the exposure time. This, in turn, can prevent a direct comparison of the pixel values, as discussed in further detail below.

Motion Mask Generation

Figure 2E:
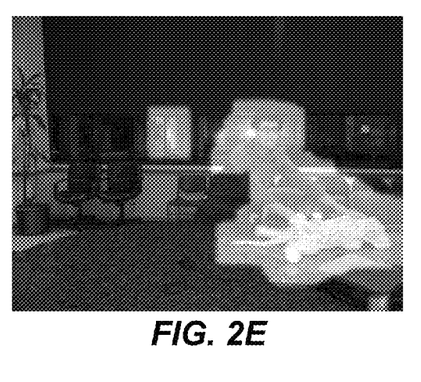
FIG. 2E, is an image of the scene shown in FIGS. 2A-2D in which highlighted areas of the image show a motion mask generated using techniques provided herein, according to an embodiment.
Figure 2F:
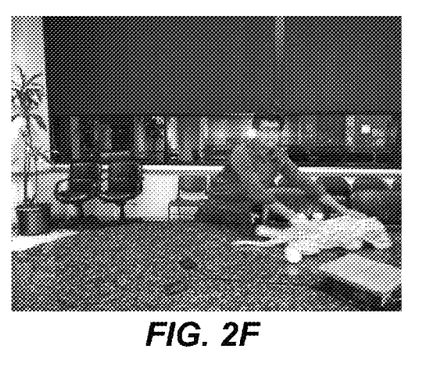
FIG. 2F shows the fused image of FIGS. 2A and 2B using an embodiment of the techniques herein.

According to techniques provided herein, a motion mask can be created to identify movement between ambient and flash images—or any two images of a scene having different illuminance—and help reduce ghosty artifacts. FIG. 2E, for example, is an image in which highlighted (lighter) areas of the image show a motion mask, after post-processing, computed using techniques provided herein. FIG. 2F shows the fused image without any ghosty artifacts, enabled by the detection of motion mask using the techniques herein.

Generally speaking, the motion mask is intended to identify parts of the scene where motion is present. In some embodiments, a motion mask $\mathcal{M}$ can be a single-channel binary image of the same size as the captured images, and is defined as:

$$\mathcal{M}(x, y) = \begin{cases} 1 & \text{if motion is present at pixel } (x, y) \\ 0 & \text{if there is no motion at pixel } (x, y) \end{cases} \quad (1)$$

Here, the inputs to the motion mask computation module are the intensity channels of the aligned flash image $I_f$ and the ambient image $I_a$.

As discussed previously, the captured images $I_a$ and $I_f$ can have significant differences due to the changes in illumination or illuminance, exposure-time, and auto white-balance. Thus, a direct comparison of the intensity values of each pixel (i.e., $I_f(x, y)$ and $I_a(x, y)$) may not yield helpful results. Because these differences between $I_a$ and $I_f$ are largely caused by irreversible and non-linear operations, there is no normalized intensity space where the two images can be compared directly. Comparing the intensity values directly can be done, however, by bringing intensities relatively close to each other before comparing them. But this comparison can be sensitive to the neighborhood size and introduces a lot of false positives in the motion mask.

In order to overcome this problem, techniques herein utilize a comparison of $I_a$ and $I_f$ in the gradient domain. Comparing $I_a$ and $I_f$ in gradient domain can be especially advantageous because the gradient of a pixel remains the same in spite of the global change in the illuminance. Thus, according to some embodiment, a motion mask is computed by utilizing gradient vectors, in which the pixel-wise gradient for both the flash and the ambient image is computed. More specifically, motion is determined to exist in a pixel location if the gradient vectors deviate from each other by more than a threshold.

Intensity values at a pixel, under the Lambertian assumption, depends on the direction and the intensity of the illumination, which can be characterized as follows:

$$I(x,y) = l(u_l) \rho \max(u_l \cdot v_r, 0) \quad (2)$$

Where, $I(x, y)$ is the intensity of the pixel at location $(x, y)$, $l$ is the intensity of the light ray coming from the direction $u_l$, which reaches a surface point with albedo $\rho$ and normal direction $v_r$.

However, the intensity and direction of the light ray can vary slowly over the scene. This implies that in small neighborhoods of the image, the impact of these changes on the intensity gradient can be assumed to be small. Hence, comparing the gradients can help in the comparison of pixels under global change in illuminance.

$\nabla I(x, y)$ represents the gradient vector of the image at pixel $(x, y)$, where the x and y direction gradients are the two components of the gradient vector. Various gradient kernels could be used to compute x and y gradients. For example, Sobel kernels may be used to compute x and y gradient of an image. Horizontal gradient can be computed using 3×3 kernel:

$$G_x = \begin{bmatrix} -1 & 0 & +1 \\ -2 & 0 & +2 \\ -1 & 0 & +1 \end{bmatrix} * I \quad (3)$$

Vertical gradient can be computed using 3×3 kernel:

$$G_y = \begin{bmatrix} -1 & -2 & -1 \\ 0 & 0 & 0 \\ +1 & +2 & +1 \end{bmatrix} * I \quad (4)$$

In both equations (3) and (4) above, the "*" is the convolution operator.

The consistency map $\zeta$ for each pixel can then be computed as:

$$\zeta = \mathcal{F}(\theta(\nabla I_f), \theta(\nabla I_a)) \quad (5)$$

Here, $\theta$ is a function that takes a gradient image, $\nabla I_f$ or $\nabla I_a$, as an input and outputs another gradient image. For instance, the output gradient image here could be a smooth version of the input gradient image (i.e., a version of the gradient image in which high-frequency noise has been removed).

The function $\mathcal{F}$ then takes the two gradient images, $\theta(\nabla I_f)$ and $\theta(\nabla I_a)$, as inputs and outputs a consistency map between the flash and the ambient images. An example of function $\mathcal{F}$ could take the projection of $\nabla I_f$ on $\nabla I_a$ and vice-versa, and summing up the two. In one embodiment, the images can be first smoothed before the gradients are computed, in order to reduce the effects of noise.

The motion mask $\mathcal{M}_{gp}$ (x, y) can then be computed as:

$$\mathcal{M}_{gp}(x,y) = \theta(x,y) > \epsilon \quad (6)$$

where $\epsilon$ is an empirically determined threshold.

To mitigate false positives in textured regions, a second embodiment may utilize an additional or alternative technique of generating a motion mask to hypothesize possible areas where motion could have occurred. Gradient vectors can again be used in this technique. Here, however, gradient vectors can be computed on the gradient of two ratio images: the first ratio image being the pixel-wise ratio of the flash and the ambient images (i.e., the ratio of each pixel of the flash image to the corresponding pixel of the ambient image), and the second ratio image being the pixel-wise ratio of the ambient and the flash images (i.e., the ratio of each pixel of the ambient image to the corresponding pixel of the flash image). The ratio images can be used to generate the motion mask using the technique described above.

Some embodiments may additionally employ another technique to hypothesize possible areas where motion could have occurred. In this technique, the motion areas are hypothesized by looking at the gradient of the ratio image $$\frac{I_f(x,y)}{I_a(x,y)}$$

and its inverse. Specifically, $$\kappa = \mathcal{H}\left(\nabla \frac{I_f}{I_a}, \nabla \frac{I_a}{I_f}\right) \quad (7)$$

Here, $\mathcal{H}$ is a function that takes the gradient of the two ratio images as an input, and outputs another consistency mask.

The value $\kappa(x, y)$ can then be averaged over a neighborhood and compared with a threshold to obtain the potential motion areas as follows:

$$\mathcal{M}_{ratio}(x,y) = \kappa(x,y) > \epsilon_2 \quad (8)$$

In some embodiments, $\epsilon_2$ is chosen to be 1.0, although other embodiments may have other threshold values, according to desired functionality. Here again, the value for $\epsilon_2$ can be determined empirically.

The final motion mask can then be computed as:

$$\mathcal{M}(x,y) = \mathcal{M}_{gp}(x,y) \wedge \mathcal{M}_{ratio}(x,y) \quad (9)$$

Here, ^ represents the pixel-wise AND operation.

Embodiments may employ a post process to remove small speckles from the mask, by first eroding the motion mask with a relatively small kernel (e.g., 3). This can be followed by relatively large kernel size dilation to cover the homogeneous regions in the motion mask. Subsequently, the motion mask can be blurred in order to smooth the boundary between motion and non-motion areas, which can enhance the blending of the image.

Figure 3A:
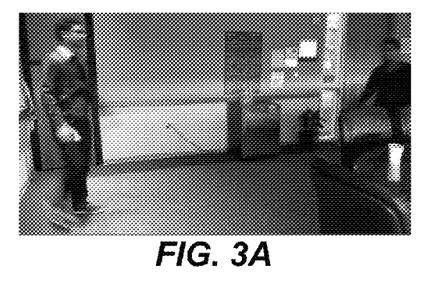
FIGS. 3A-3F are a series of example photographs and images generated therefrom, illustrating a technique for generating a motion mask according to an embodiment.
Figure 3B:
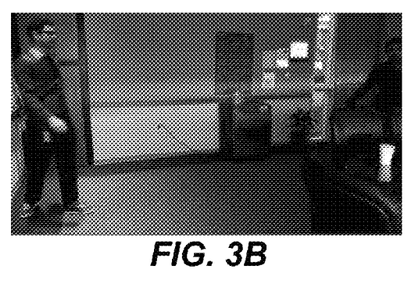
Figure 3C:
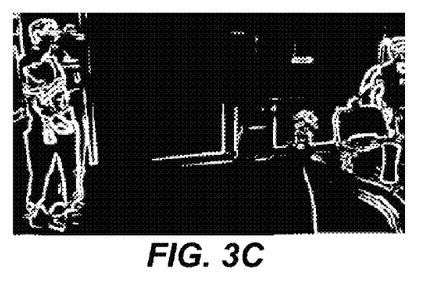
Figure 3D:
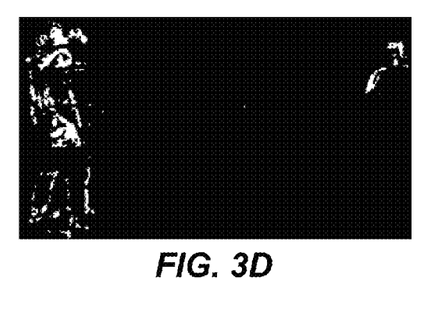
Figure 3E:
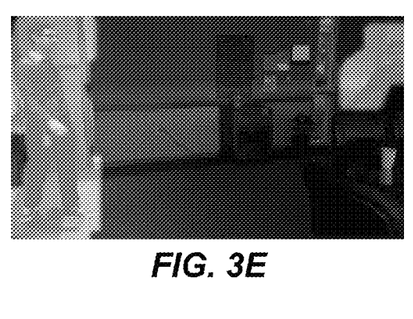
Figure 3F:
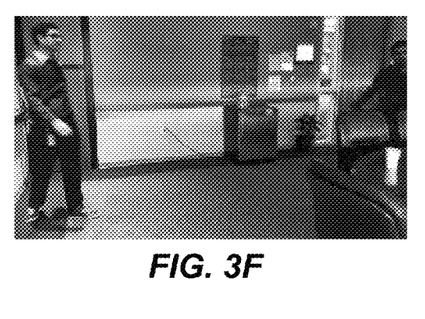

An example of motion mask generation using these techniques is shown in FIGS. 3A-3F. Here, the ambient image is shown in FIG. 3A, and the flash image is shown in FIG. 3B. This image pair (flash and ambient images) is then used to generate the potential motion mask areas using the techniques shown above. FIG. 3C shows the potential motion mask areas, $\mathcal{M}_{ratio}$ (x, y), and FIG. 3D shows the final motion mask, $\mathcal{M}$ (x, y). The mask $\mathcal{M}$ (x, y) can then be post-processed, where the mask (shown by the highlighted portions) can undergo speckle removal and blur. In some embodiments, speckle removal may involve eroding the motion mask with a small kernel (e.g., a kernel size of 3 pixels), followed by a relatively larger kernel size to help cover the homogeneous regions of the motion mask. Blur can be applied to the motion mask to help smooth the boundary between motion and non-motion areas, which can enhance blending. FIG. 3E illustrates and example of a motion-mask (highlighted) after undergoing post-processing.

Blending

Blending can be implemented in a variety of ways to help ensure reduce the appearance of artifacts. However, as previously mentioned, the differences in the ambient and flash images can make the fusion of these images a significantly more challenging problem than the fusion of exposure stack images in other applications, such as the weighted combination typically used in High Dynamic Range (HDR). Accordingly, some embodiments can blend the flash and the ambient images by using a pyramid fusion technique. For example, the Laplacian pyramid can be used, which decomposes an image into band-pass filtered versions of the image at different scales. A detailed description of the Laplacian pyramid can be found in "A multi-resolution spline with application to image mosaics," P. J. Burt and E. H. Adelson, ACM Transactions on Graphics (TOG), 2(4), 1983, which is incorporated by reference herein in its entirety.

Once the two input images are decomposed into their respective Laplacian pyramids, weights are computed at each level of the pyramid. Through empirical results, the inventors have discovered that generating weights for each pyramid level can be more effective than using the same weights for different levels of the pyramid. In order to generate these weights, the corresponding images in the Gaussian pyramid can be used as input to the algorithm that generates the weights for the intensity and the chroma channels.

Figure 4A:
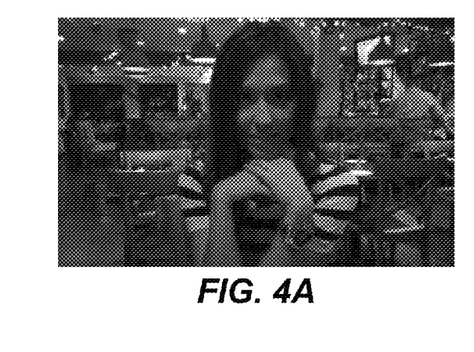
FIGS. 4A-4F are a series of example photographs and images generated therefrom, provided to illustrate an embodiment of a Laplacian pyramid fusion technique.
Figure 4B:
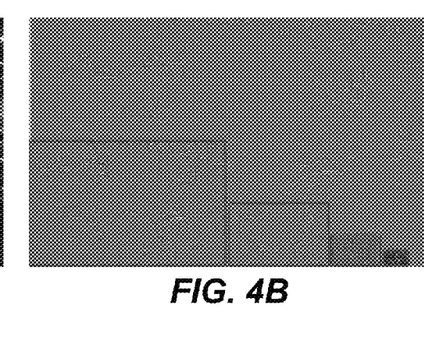
Figure 4C:
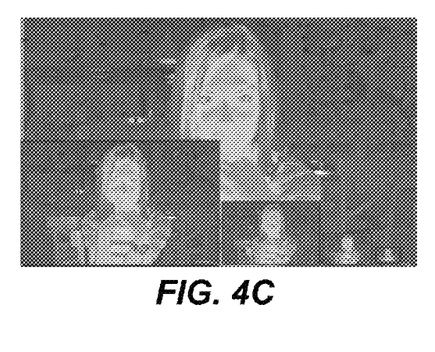
Figure 4D:
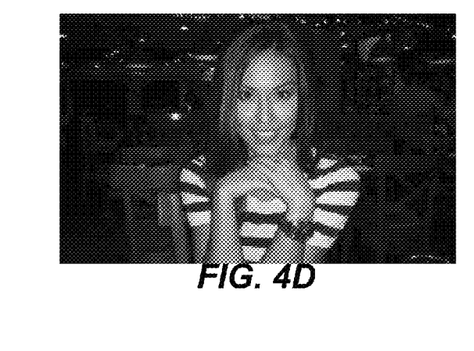
Figure 4E:
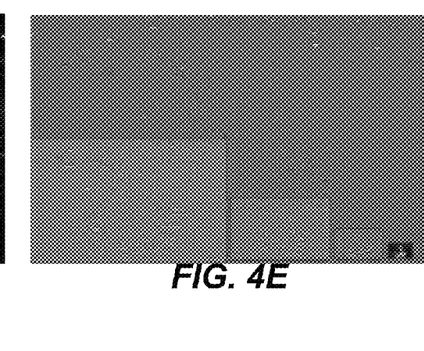

An example of such a pyramid is shown FIGS. 4A-4F. Here, FIGS. 4A and 4D are ambient and flash images, respectively. FIG. 4B shows the Laplacian pyramid generated for the intensity channel of the ambient image, and FIG. 4E shows the Laplacian pyramid generated for the intensity channel of the flash image. FIG. 4C shows the weights computed at different scales.

Figure 4F:
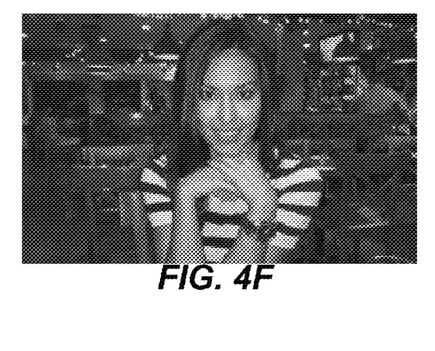

Multi-resolution blending using Laplacian pyramids is very effective at avoiding seams. This is because it blends image features (e.g., edges) instead of the image intensities. In other words, sharp transition in the weight maps, can only affect the sharp transitions in the image. This is because the multi-resolution blending does a weighted combination of sharp transitions (Laplacian) in the image and not the intensity images. This implies that the flat regions in the original images do not get affected by possibly sharp variations in the weight function. This property of multi-resolution blending makes it an effective way of fusing the flash and no-flash image. FIG. 4F shows the fused image using the Laplacian pyramid. As can be seen, there are no seam artifacts in the fused image.

Traditionally, the motion mask has been used in multi-resolution blending by computing motion mask one of the levels, then using this at all pyramid levels. Although some embodiments may employ this technique, the effective fusion achieved this way can be improved by a large amount. In particular, embodiments may increase the effective fusion by computing motion mask at each pyramid level separately. That is, by computing motion mask at each pyramid level, a pixel may be determined to be under motion mask only when the fusion would lead to artifacts in the fused image.

Depending on desired functionality, some embodiments may not even compute the motion mask at the top few scales. This is because motion often does not introduce motion artifacts at scales corresponding to very small resolutions. By not computing motion mask, the increase the color and brightness of the fused image can be increased.

It will be understood that embodiments may utilize any combination of motion mask generation and/or blending techniques described above, including any of these techniques individually. For example, some embodiments may simply utilize the techniques described for using a gradient in motion mask generation. Other embodiments may combine a motion mask generated from gradient images with a motion mask generated with a ratio image, as described above. Embodiments may further use either or both of these motion mask techniques with some or all of the blending techniques additionally described. A person of ordinary skill in the art will recognize many variations.

Figure 5:
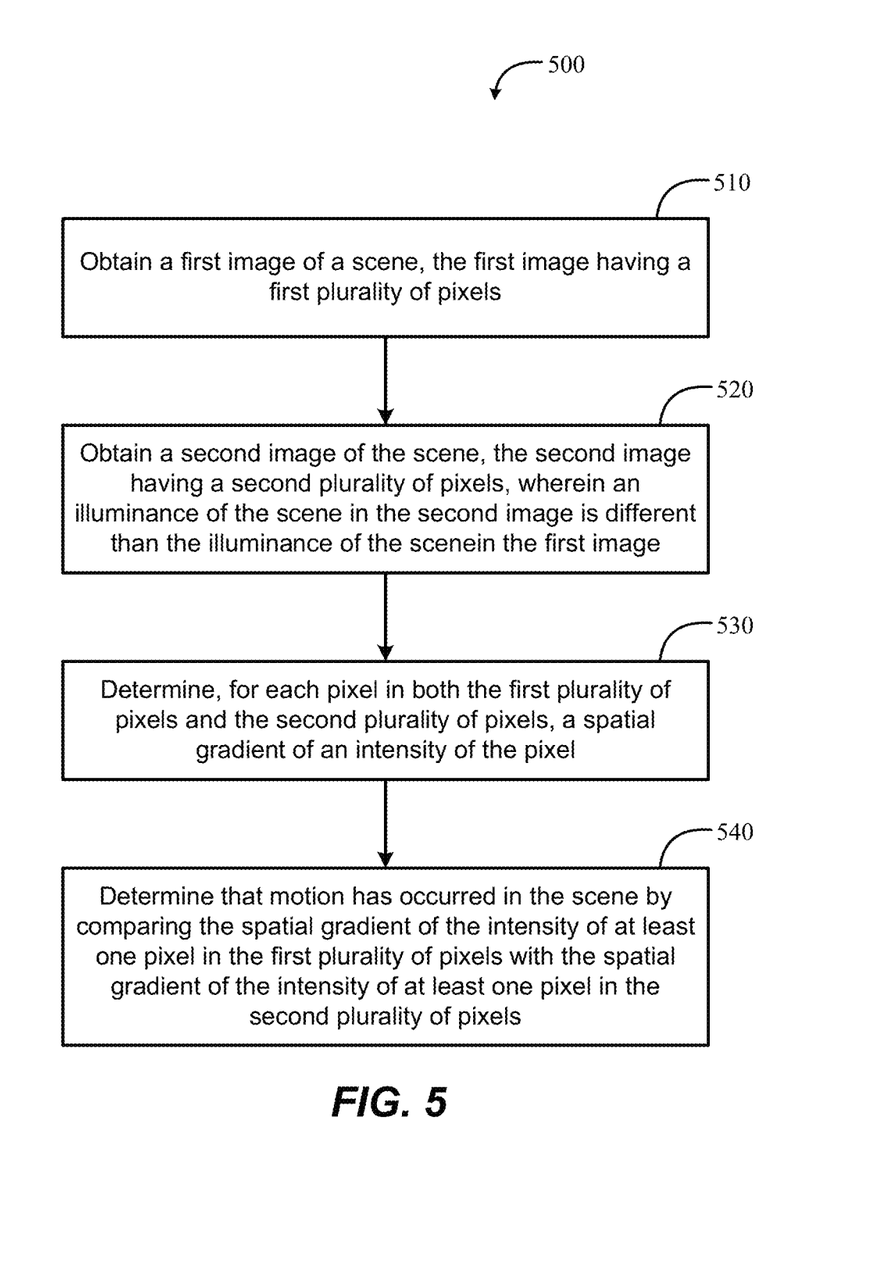
FIG. 5 is a flow diagram illustrating an embodiment of a method of detecting motion between two images of a scene.

FIG. 5 is a flow diagram illustrating an embodiment of a method 500 of detecting motion between two images of a scene. Some or all of the functions of the method 500 can be used, for example, to determine a motion mask $\mathcal{M}_{gp}$ (x, y) using the gradients of images, as described above. It can be noted that other embodiments may include variations on the functionality shown in the blocks of FIG. 6, including, for example, adding, separating, and/or omitting blocks, executing the functionality of different blocks in a different order than shown, and/or simultaneously. As described in further detail below, means for performing some or all of the functionality illustrated in FIG. 5 can include hardware and/or software components of a mobile device, such as the mobile device 600 illustrated in FIG. 6.

Figure 6:
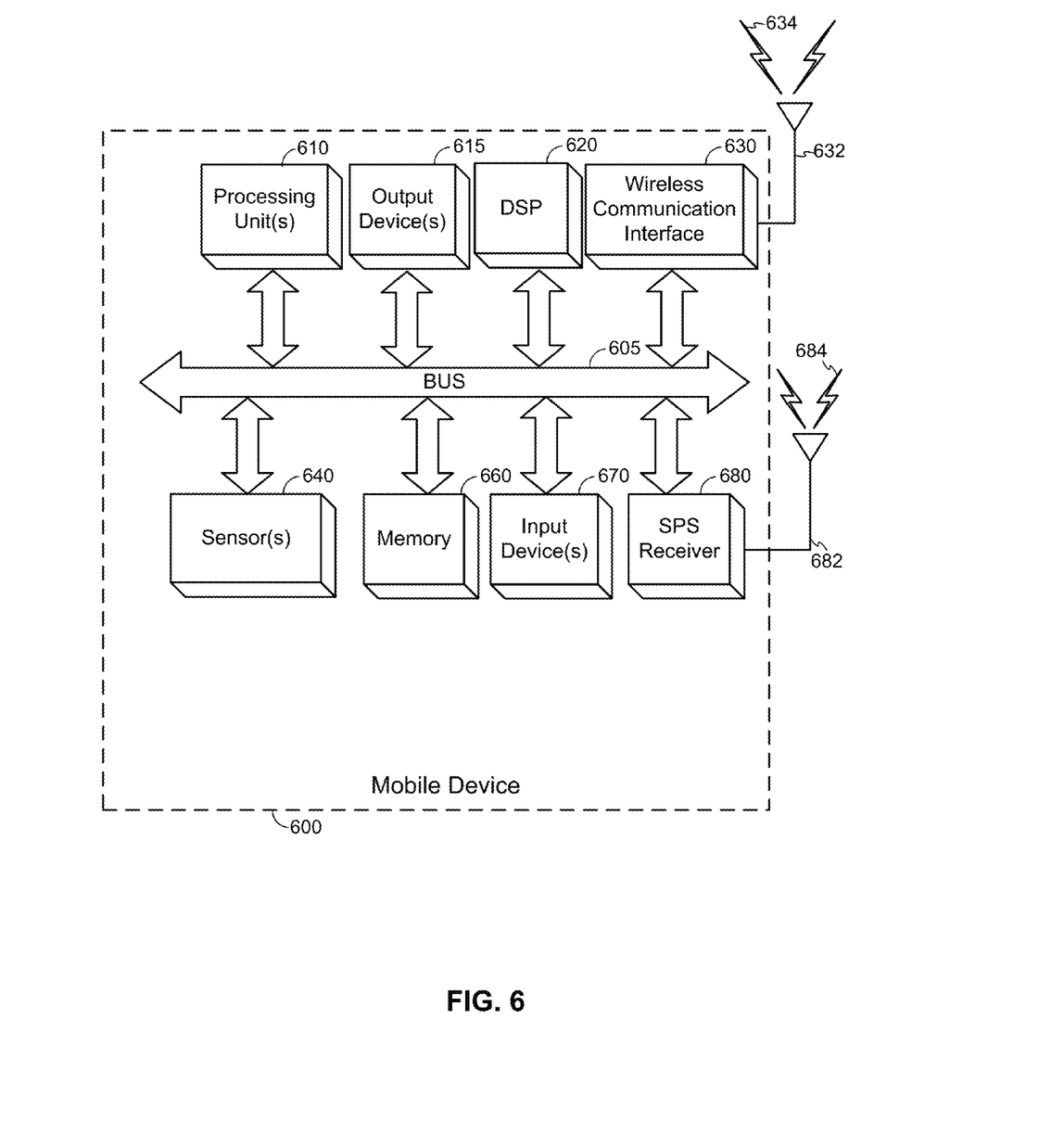
FIG. 6 is a block diagram an embodiment of a wireless device.

At block 510, a first image of a scene is obtained, where the first image has a first plurality of pixels. The image can, for example, be captured and/or processed by a camera of a mobile device executing some or all of the method 500 of FIG. 500. In some embodiments, the image may be obtained by a separate device (e.g., a camera) and provided to a computing device (e.g., a mobile device, personal computer, tablet, etc.) that executes some or all of the method of FIG. 500. Means for performing some or all of the functionality of block 510 can include sensor(s) 640 (e.g., a camera), bus 605, processing unit(s) 610, DSP 620, memory 660, and/or other components of a mobile device 600 as shown in FIG. 6.

At block 520, a second image of the scene is obtained, where the second image has a second plurality of pixels, and an illuminance of the scene in the second image is different than the illuminance of the scene in the first image. As described in the embodiments above, the second image may comprise a flash image of a scene and the first image is a flash image. Alternatively, the second image may comprise an ambient image and the first image can comprise a flash image. More broadly, as noted above, embodiments may be applied to two images of a scene having a different illuminance—regardless of where the difference in illuminance comes from (e.g., from a flash or not). Thus, both images may be flash images, ambient images, and/or other ambient images of a scene having different illuminance. Additionally or alternatively, either or both images may be derived from captured images. That is, either or both images (e.g., a ratio image, intensity image, etc.) may be obtained from the processing one or both captured images (e.g., flash and/or ambient images). Means for performing some or all of the functionality of block 520 can be similar to the means for performing the functionality of block 510. That is, means may include sensor(s) 640 (e.g., a camera), bus 605, processing unit(s) 610, DSP 620, memory 660, and/or other components of a mobile device 600 as shown in FIG. 6.

At block 530, for each pixel in both the first plurality of pixels and the second plurality of pixels, a spatial gradient of an intensity of the pixel is determined. As shown above, the spatial gradient may be based on intensity values in the spatial neighborhood of the pixel. For example, gradient in the x direction at pixel (x, y) of an image could be determined as:

$$I_{gx}(x,y)=I(x,y)-0.5(x-1,y)+I(x+1,y)) \quad (10)$$

Similarly, gradient in they direction at pixel (x, y) of an image could be determined as:

$$I_{gy}(x,y)=I(x,y)-0.5(I(x,y-1)+I(x,y+1)) \quad (11)$$

Alternatively Sobel kernel defined above (see equations (3) and (4)) could be used for computation of gradient images.

Means for performing some or all of the functionality of block 530 may include bus 605, processing unit(s) 610, DSP 620, memory 660, and/or other components of a mobile device 600 as shown in FIG. 6.

At block 540, it is determined that a motion has occurred in the scene by comparing the spatial gradient of the intensity of at least one pixel in the first plurality of pixels with the spatial gradient of the intensity of at least one pixel in the second plurality of pixels. As discussed previously, the spatial gradient of at least one pixel in each image can be determined (e.g., a gradient vector and/or gradient image), and motion (e.g., a motion mask) can be determined therefrom. In some embodiments, determining that a motion has occurred comprises determining that the gradient of the intensity of at least one pixel in the first plurality of pixels deviates from the gradient of the intensity of at least one pixel in the second plurality of pixels (e.g., a corresponding pixel having the same or similar x and y coordinates) by more than a threshold value. Optionally, a motion bask may be determined from the determination that motion has occurred, using, for example, the techniques previously described. Means for performing some or all of the functionality of block 540 may include bus 605, processing unit(s) 610, DSP 620, memory 660, and/or other components of a mobile device 600 as shown in FIG. 6.

FIG. 6 illustrates an embodiment of a wireless device 600, which can be utilized to capture images and/or perform some or all of the image processing functions described herein, including some or all of the functions of the method 500 of FIG. 5. It should be noted that FIG. 6 is meant only to provide a generalized illustration of various components, any or all of which may be utilized as appropriate. It can also be noted that, in some instances, components illustrated by FIG. 6 can be localized to a single physical device and/or distributed among various networked devices, which may be disposed at different physical locations. In some embodiments, for example, the wireless device 600 can be a cellular telephone or other mobile electronic device, such as a laptop, tablet computer, portable media player, head-mounted display, wearable device, and the like. Other embodiments may additionally or alternatively utilize another type of electronic devices.

The wireless device 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein, such as those described in relation to FIG. 5. As shown in FIG. 6, some embodiments may have a separate DSP 620, depending on desired functionality. The wireless device 600 also can include one or more input devices 670, which can include without limitation a touch screen, a touch pad, microphone, button(s), dial(s), switch(es), and/or the like; and one or more output devices 615, which can include without limitation a display, flash (e.g., LED diode) and/or other illuminating component, speakers, and/or the like.

The wireless device 600 might also include a wireless communication interface 630, which can include without limitation a modem, a network card, an infrared communication device, a wireless communication device, and/or a chipset (such as a Bluetooth™ device, an IEEE 802.11 device (utilizing one or more of the 802.11 standards, such as those described herein), an IEEE 802.15.4 device, a WiFi device, a WiMax device, cellular communication facilities, etc.), and/or the like. The wireless communication interface 630 may permit data to be exchanged with a network, wireless access points, other computer systems, and/or any other electronic devices described herein. The communication can be carried out via one or more wireless communication antenna(s) 632 that send and/or receive wireless signals 634.

Depending on desired functionality, the wireless communication interface 630 can include separate transceivers to communicate with base transceiver stations and other wireless devices and access points, which may include communicating with different data networks and/or network types. A wireless wide-area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, and so on. LTE, LTE Advanced, GSM, and W-CDMA are described in documents from 3rd Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The wireless device 600 can further include sensor(s) 640. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 640 can be utilized, among other things, for dead reckoning and/or other positioning methods, which may be used in conjunction with techniques provided herein for the provisioning of the wireless device 600 and/or other devices in a network.

The wireless device 600 may further include and/or be in communication with a memory 660. The memory 660 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 660 of the wireless device 600 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, including the method described in FIG. 5, might be implemented as code and/or instructions executable by the wireless device 600 (and/or a processing unit within a wireless device 600) (and/or another device of a positioning system). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of detecting motion between two images of a scene, the method comprising:
    obtaining a first image of the scene, the first image having a first plurality of pixels;
    obtaining a second image of the scene, the second image having a second plurality of pixels, wherein an illuminance of the scene in the second image is different than the an illuminance of the scene in the first image;
    determining, for each pixel in both the first plurality of pixels and the second plurality of pixels, a spatial gradient of an intensity of the pixel; and
    determining that motion has occurred in the scene by comparing the spatial gradient of the intensity of at least one pixel in the first plurality of pixels with the spatial gradient of the intensity of at least one pixel in the second plurality of pixels.

2. The method of claim 1, wherein comparing the spatial gradient of the intensity of the at least one pixel in the first plurality of pixels with the spatial gradient of the intensity of the at least one pixel in the second plurality of pixels comprises determining that the spatial gradient of the intensity of the at least one pixel in the first plurality of pixels deviates from the spatial gradient of the intensity of the at least one pixel in the second plurality of pixels by more than a threshold value.

3. The method of claim 1, further comprising computing a motion mask based on the determination that motion has occurred.

4. The method of claim 1, wherein:
    the first image is a first ratio image comprising a pixel-wise ratio of a first captured image of the scene to a second captured image of the scene; and
    the second image is a second ratio image comprising a pixel-wise ratio of the second captured image of the scene to the first captured image of the scene.

5. The method of claim 1, wherein:
    the first image comprises a first captured image of the scene in which the scene is illuminated by a flash, and
    the second image comprises a second captured image of the scene in which the scene is not illuminated by the flash.

6. The method of claim 1, further comprising creating a third image of the scene based on the determination that motion has occurred.

7. The method of claim 6, wherein:
    creating the third image of the scene comprises utilizing a Laplacian pyramid fusion technique; and
    a motion mask, indicative of the determined motion, is generated at all pyramid levels.

8. The method of claim 6 wherein:
    creating the third image of the scene comprises utilizing a Laplacian pyramid fusion technique; and
    a motion mask, indicative of the determined motion, is not generated in at least the level having the lowest resolution.

9. The method of claim 1, further comprising creating a motion mask having the same resolution as the first image and the second image, the motion mask indicating, for each pixel in the motion mask, if motion is detected.

10. An apparatus comprising:
    a memory; and
    a processing unit communicatively coupled to the memory and configured to:
        obtain a first image of a scene, the first image having a first plurality of pixels;
        obtain a second image of the scene, the second image having a second plurality of pixels, wherein an illuminance of the scene in the second image is different than the an illuminance of the scene in the first image;
        determine, for each pixel in both the first plurality of pixels and the second plurality of pixels, a spatial gradient of an intensity of the pixel; and
        determine that motion has occurred in the scene by comparing the spatial gradient of the intensity of at least one pixel in the first plurality of pixels with the spatial gradient of the intensity of at least one pixel in the second plurality of pixels.

11. The apparatus of claim 10, wherein the processing unit is configured to compare the spatial gradient of the intensity of the at least one pixel in the first plurality of pixels with the spatial gradient of the intensity of the at least one pixel in the second plurality of pixels by determining that the spatial gradient of the intensity of the at least one pixel in the first plurality of pixels deviates from the spatial gradient of the intensity of the at least one pixel in the second plurality of pixels by more than a threshold value.

12. The apparatus of claim 10, wherein the processing unit is further configured to compute a motion mask based on the determination that motion has occurred.

13. The apparatus of claim 10, further comprising a camera communicatively coupled to the processing unit and configured to capture a first captured image of the scene and a second captured image of the scene, wherein:
the first image is a first ratio image comprising a pixel-wise ratio of the first captured image of the scene to the second captured image of the scene;
the second image is a second ratio image comprising a pixel-wise ratio of the second captured image of the scene to the first captured image of the scene;
and wherein the processing unit is further configured to create the first image and the second image from the first captured image of the scene to the second captured image of the scene.

14. The apparatus of claim 10, wherein the processing unit is further configured to create a third image of the scene based on the determination that motion has occurred.

15. The apparatus of claim 14, wherein the processing unit is configured to create the third image of the scene by utilizing a Laplacian pyramid fusion technique where a motion mask, indicative of the determined motion, is generated at all pyramid levels.

16. The apparatus of claim 14, wherein the processing unit is configured to create the third image of the scene by utilizing a Laplacian pyramid fusion technique where a motion mask, indicative of the determined motion, is not generated in at least the level having the lowest resolution.

17. The apparatus of claim 10, wherein the processing unit is configured to create a motion mask having the same resolution as the first image and the second image, the motion mask indicating, for each pixel in the motion mask, if motion is detected.

18. A non-transitory computer-readable medium having instructions embedded therein for detecting motion between two images of a scene, the instructions comprising computer code for causing one or more computers to:
obtain a first image of the scene, the first image having a first plurality of pixels;
obtain a second image of the scene, the second image having a second plurality of pixels, wherein an illuminance of the scene in the second image is different than the an illuminance of the scene in the first image;
determine, for each pixel in both the first plurality of pixels and the second plurality of pixels, a spatial gradient of an intensity of the pixel; and
determine that motion has occurred in the scene by comparing the spatial gradient of the intensity of at least one pixel in the first plurality of pixels with the spatial gradient of the intensity of at least one pixel in the second plurality of pixels.

19. The non-transitory computer-readable medium of claim 18, wherein the instructions further comprise computer code for causing the one or more computers to compute a motion mask based on the determination that motion has occurred.

20. The non-transitory computer-readable medium of claim 18, wherein the instructions further comprise computer code for causing the one or more computers to create a third image of the scene based on the determination that motion has occurred.

\* \* \* \* \*